US011016022B2

(12) United States Patent
Yurt et al.

(10) Patent No.: US 11,016,022 B2
(45) Date of Patent: May 25, 2021

(54) MULTIMODAL IMAGING SYSTEM

(71) Applicants: IMEC VZW, Leuven (BE); Katholieke Universiteit Leuven, KU LEUVEN R&D, Leuven (BE)

(72) Inventors: Abdulkadir Yurt, Heverlee (BE); Jasper Marien, Berlaar (BE); Andy Lambrechts, Herent (BE)

(73) Assignee: IMEC vzw, Leuven (BE)

(*) Notice: Subject to any disclaimer, the term of this patent is extended or adjusted under 35 U.S.C. 154(b) by 0 days.

(21) Appl. No.: 16/713,549

(22) Filed: Dec. 13, 2019

(65) Prior Publication Data
US 2020/0191706 A1 Jun. 18, 2020

(30) Foreign Application Priority Data

Dec. 13, 2018 (EP) .................................... 18212415

(51) Int. Cl.
*G01N 21/31* (2006.01)
*G02B 21/16* (2006.01)
(Continued)

(52) U.S. Cl.
CPC ............. *G01N 21/31* (2013.01); *G02B 21/16* (2013.01); *G02B 21/361* (2013.01);
(Continued)

(58) Field of Classification Search
CPC ... G01N 2021/8848; G01N 21/31; G01J 3/45; G01J 2023/2826; G01J 2003/2826;
(Continued)

(56) References Cited

U.S. PATENT DOCUMENTS 5,751,384 A * 5/1998 Sharp .................. G02B 27/288
349/18
9,541,493 B2 * 1/2017 Matsumoto ........ G01N 21/8901
(Continued)

FOREIGN PATENT DOCUMENTS

WO 2017/196995 A1 11/2017
WO 2017/205530 A1 11/2017
WO 2018/70451 A1 4/2018

OTHER PUBLICATIONS

Johnson, Robert L., "Bandpass Filters: Past and Present", Photonics Handbook, https://www.photonics.com/Article.aspx?AID=25446, 11 pages.

Primary Examiner — David E Harvey
(74) Attorney, Agent, or Firm — McDonnell Boehnen Hulbert & Berghoff LLP

(57) ABSTRACT

A multimodal imaging system comprises a light source, an image sensor comprising a plurality of pixels, and an optical filter comprising a first filter element and a second filter element. The light source emits partially coherent polarized light, and the first filter element and second filter element are arranged as an array parallel to the image sensor. The first filter element is configured for attenuated transmission of a first light spectrum, which comprises polarized light emitted by the light source, and the second filter element is configured for transmission of a second light spectrum. The image sensor is configured to simultaneously capture light impinging on the image sensor from both the first filter element and the second filter element. Each filter element of the optical filter is configured for transmission of light to a subset of the imager pixels.

20 Claims, 9 Drawing Sheets

(51) Int. Cl.
*G02B 21/36* (2006.01)
*G06T 7/00* (2017.01)
*H04N 5/225* (2006.01)

(52) U.S. Cl.
CPC ......... *G06T 7/0012* (2013.01); *H04N 5/2254* (2013.01); *H04N 5/2256* (2013.01); *G06T 2207/10056* (2013.01); *G06T 2207/10064* (2013.01); *G06T 2207/10152* (2013.01)

(58) Field of Classification Search
CPC .... G02B 21/361; G02B 21/16; G06T 7/0012; G06T 2207/10056; G06T 2207/10064; G06T 2207/10152; H04N 5/2256; H04N 5/2254
See application file for complete search history.

(56) References Cited

U.S. PATENT DOCUMENTS

| | | | | |
|---|---|---|---|---|
| 10,390,718 B2* | 8/2019 | Chen | ............. | A61B 5/721 |
| 2002/0131049 A1* | 9/2002 | Schmitt | ............. | G02B 6/2773 |
| | | | | 356/479 |
| 2004/0006275 A1* | 1/2004 | Demos | ............. | A61B 5/0075 |
| | | | | 600/476 |
| 2005/0041249 A1* | 2/2005 | Dobbs | ............. | G01N 21/21 |
| | | | | 356/364 |
| 2005/0167621 A1* | 8/2005 | Zeng | ............. | G01J 3/10 |
| | | | | 250/580 |
| 2005/0273011 A1* | 12/2005 | Hattery | ............. | A61B 5/0059 |
| | | | | 600/476 |
| 2006/0195014 A1* | 8/2006 | Seibel | ............. | A61B 1/0661 |
| | | | | 600/102 |
| 2007/0153281 A1* | 7/2007 | Gordon | ............. | G01N 21/31 |
| | | | | 356/419 |
| 2007/0203413 A1* | 8/2007 | Frangioni | ............. | A61B 1/3132 |
| | | | | 600/478 |
| 2008/0018966 A1 | 1/2008 | Dubois et al. | | |
| 2008/0118886 A1 | 5/2008 | Liang et al. | | |
| 2008/0132794 A1* | 6/2008 | Alfano | ............. | A61B 5/415 |
| | | | | 600/476 |
| 2009/0262408 A1 | 10/2009 | Ogasawara | | |
| 2010/0245616 A1* | 9/2010 | Yoshino | ............. | A61B 1/0646 |
| | | | | 348/223.1 |
| 2011/0029049 A1* | 2/2011 | Vertikov | ............. | A61B 5/14532 |
| | | | | 607/104 |
| 2011/0068007 A1* | 3/2011 | Pang | ............. | G01N 27/44721 |
| | | | | 204/603 |
| 2011/0169978 A1* | 7/2011 | Lasser | ............. | A61B 5/742 |
| | | | | 348/222.1 |
| 2011/0292258 A1* | 12/2011 | Adler | ............. | H04N 9/04557 |
| | | | | 348/263 |
| 2012/0218379 A1 | 8/2012 | Ozcan et al. | | |
| 2016/0041094 A1 | 2/2016 | Lei | | |
| 2016/0119557 A1* | 4/2016 | Hunt | ............. | H04N 5/332 |
| | | | | 348/131 |
| 2017/0020377 A1* | 1/2017 | Takeuchi | ............. | A61B 1/043 |
| 2017/0100024 A1* | 4/2017 | Shahmoon | ............. | A61B 1/00167 |
| 2017/0343792 A1* | 11/2017 | Matsunobu | ............. | G02B 19/0047 |
| 2018/0046139 A1 | 2/2018 | Stahl et al. | | |
| 2018/0196246 A1* | 7/2018 | Bares | ............. | G01J 3/0208 |
| 2018/0292310 A1* | 10/2018 | Kojima | ............. | G01J 3/00 |
| 2019/0281204 A1* | 9/2019 | Darty | ............. | A61B 5/443 |
| 2020/0069164 A1* | 3/2020 | Oki | ............. | A61B 1/00009 |
| 2020/0315432 A1* | 10/2020 | Tully | ............. | A61B 1/00105 |

* cited by examiner

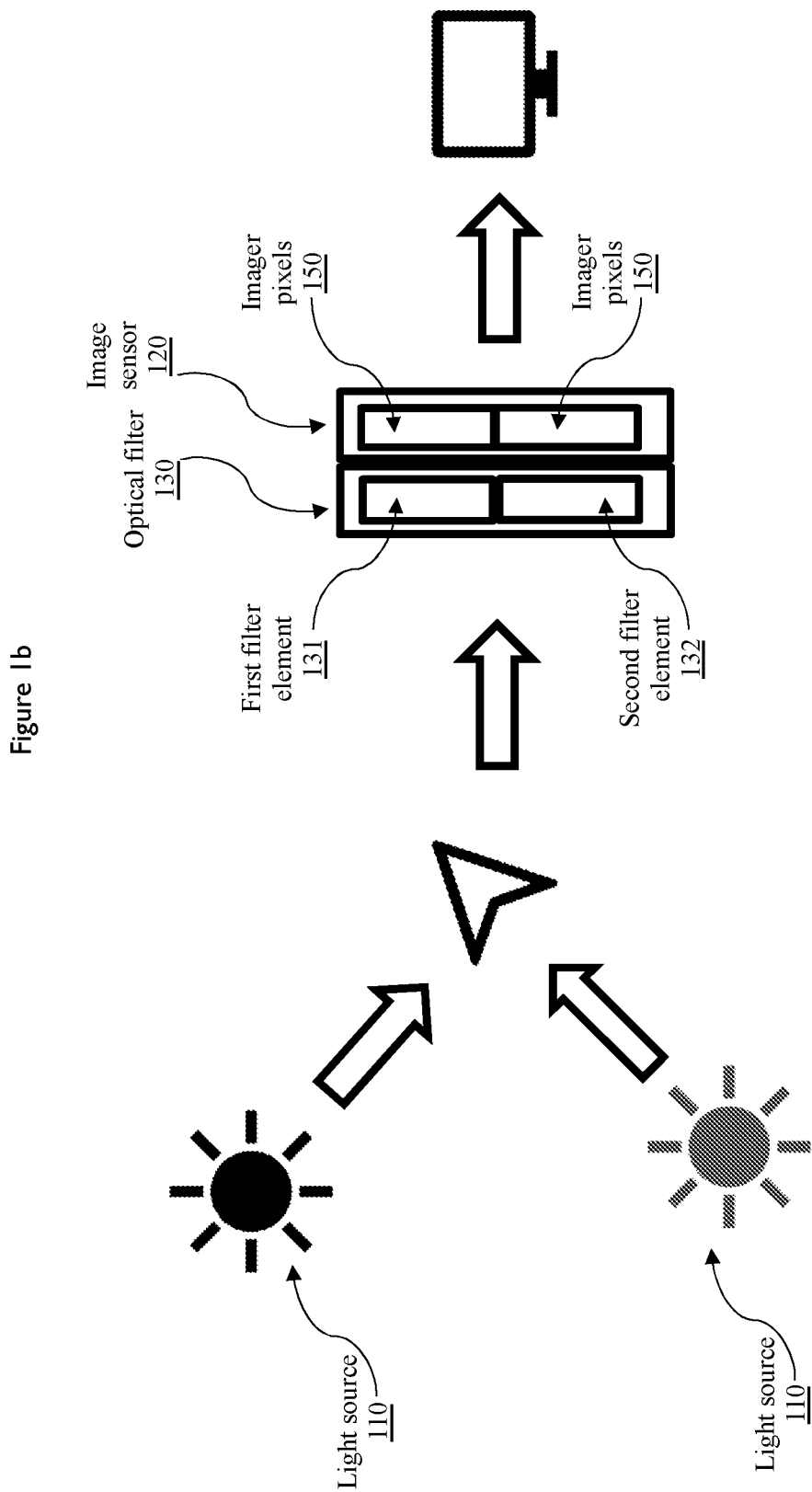

MULTIMODAL IMAGING SYSTEM

CROSS-REFERENCE TO RELATED APPLICATIONS

The present application is a non-provisional patent application claiming priority to European Patent Application No. 18212415.6, filed Dec. 13, 2018, the contents of which are hereby incorporated by reference.

FIELD OF THE DISCLOSURE

The embodiments disclosed herein relate to a system for the simultaneous capture of multiple images of different modalities.

BACKGROUND

Different imaging modalities often require specialized imaging systems as the light illumination and detection parameters can vary significantly between them. These variations often lead to the use of single mode imaging systems and limit multi-modal imaging to a small subset of the available imaging options. The present concept aims to address these issues.

In many biological and medical applications such as cell biology, histology, cytometry and oncology, the investigation of biological material can benefit from the use of multiple imaging modalities. The use of multiple modalities can help to provide information on morphology, function and composition in a manner which offers improved detail over any single technique alone.

US20160041094A1 discloses a lens-free imaging system suitable for in-vitro medical diagnostics with an emphasis on the detection of particles, e.g. blood cells. The approach they disclose includes imaging of a fluidic chamber either while fluid containing the particles is static or while it is flowing. With this approach they indicate that either shadow images or fluorescence images may be produced.

It is possible to capture images asynchronously and then compare or combine them later. However, it can be difficult to align the images or compare on a true like for like basis when capturing images at different times, e.g. if imaging particles suspended in a flowing fluid medium. Hence, the simultaneous capture of different imaging modalities offers an improvement in the usefulness of the resultant images. Capturing these images both simultaneously and individually can be better because the images may then be compared on a true like for like basis, or later combined electronically, or both. However, the incompatibility of different imaging modes makes simultaneous image capture challenging and often leads to the use of separate optical imaging systems which can be costly and difficult to implement in a single apparatus.

SUMMARY

An objective of the disclosure is to provide a multimodal imaging system which can capture different imaging modalities both simultaneously and individually.

In an example embodiment the multimodal imaging system comprises a light source, an image sensor comprising a plurality of pixels, and an optical filter comprising a first filter element and a second filter element, characterized in that the light source emits partially coherent polarized light, and the first filter element and second filter element are arranged as an array parallel to the image sensor, wherein the first filter element is configured for attenuated transmission of a first light spectrum which comprises polarized light emitted by the light source, and the second filter element is configured for transmission of a second light spectrum, and the image sensor is configured to simultaneously capture light impinging on it from both the first filter element and the second filter element, wherein each filter element of the optical filter is configured for transmission of light to a subset of the imager pixels, and each pixel receives light via a single filter element.

Emission of light from a first light source which is at least partially polarized can provide a light spectrum suitable for selective detection based upon its polarization. A variety of alternative embodiments are possible in accordance with this approach, e.g. the polarization may be linear, circular, elliptical, or any other geometrical orientation or combination known in the art which generates a distinctive polarization feature on which to base detection of the light spectrum. The second light spectrum may be unpolarized, or may be of a different polarization or polarization combination to the first light spectrum such that each light spectrum can be differentiated.

In an alternative embodiment which may be combined with previously presented embodiments, the degree of polarization of the first light spectrum is not equal to the degree of polarization of the second light spectrum, where the degree of polarization (DOP) is the proportion of the light which is polarized. This approach of provides easily separable light intensity within the polarization domain.

In another alternative embodiment, which may be combined with any previously presented embodiments, the frequency components of light comprising the first light spectrum differ from the frequency components of light comprising the second light spectrum. The two light spectra may be separable by various frequency domain criteria. While the first light spectrum and the second light spectrum are not identical, they may have some common frequency components while still being amenable to separation in the frequency domain, e.g. by low pass, high pass, band pass or band stop filtering techniques and combinations thereof. These spectral filtering techniques may be applied in ways known in the art, e.g. interference, absorptive or dichroic filters, and using implementations based on standard techniques such as multi-layer thin films.

In another alternative embodiment, which may be combined with any previously presented embodiments, the light source may emit a sequence of light pulses. When light pulses are utilized, the first light spectrum comprises a first pulse sequence and the second light spectrum comprises a second pulse sequence. The second pulse sequence may also comprise a single pulse, i.e. a continuous, or substantially continuous energy flux level. Provided the first pulse sequence and the second pulse sequence are different, this approach provides easily separable light intensity within the time domain.

According to a further embodiment, which may be combined with any previously presented embodiments, the energy flux of light impinging on the image sensor from any filter element of the optical filter is within the dynamic range of the image sensor. This is an improvement because different imaging modalities often result in different light intensities. Where these intensities vary significantly, the illuminance of light impinging on the image sensor exceeds the dynamic range of the sensor and thereby prevents the sensor from capturing the required image detail for all of the imaging modalities.

In an alternative embodiment which may be combined with any previously presented embodiments, at least the first filter element comprises a spectral filter component and a polarizing filter component arranged in the same light path. The ability to be able to utilize the polarizing filter in combination with a polarizing light source as a control and selection mechanism for light passing through the filter can be an improvement. When combined with a spectral filter it provides an additional separation and control mechanism.

In an alternative embodiment, the second filter element also comprises a polarizing filter component, and the polarizing filter component of the first filter element has a lower Polarization Extinction Ratio (PER) than the polarizing filter component of the second filter element. In this case, the polarizing filters may be used to attenuate the passage of light which is useful when each filter is associated with a different imaging modality and the resultant light intensities of each modality vary significantly. However, the ability to use polarizing filters to control attenuation is not dependent on its combination with other filter components, or on other filter elements also comprising polarizing filter components.

When polarizing filters are used, an embodiment of the polarizing filter component comprises a wire-grid based polarizing filter. This approach to the creation of polarizing filters is easy to implement and can be achieved reliably and repeatably. It also provides means of fabrication which is compatible with image sensors.

In another alternative embodiment which may be combined with any of the other embodiments, one of the imaging modes is holographic imaging. Digital holographic imaging offers both lateral and depth resolution resulting in 3-dimensional imaging with the ability to provide detail to the micron range which is useful for biological and microbiological application. The detailed structural information contained in holographic images can be especially helpful in the investigation of biological materials at the microscopic level.

In an alternative embodiment which may be combined with any of the other embodiments, one of the imaging modes is fluorescence imaging. This imaging mode is widely used in biological applications, especially in fluorescence microscopy where it is used for many applications associated with the observation of living cells and organisms. It may, for example, be used to improve the differentiation of individual cells or identify specific features of cell types. Fluorescence is also difficult to combine with other imaging modalities because it provides much lower light emission characteristics than most.

In an alternative embodiment which may be combined with any of the other embodiments, one of the imaging modes is photoluminescence imaging. This imaging mode is widely used in industrial applications, especially in microscopy where it is used for many applications associated with the observation of defects and functions of engineered materials such as semiconductor devices in combination with an external light stimuli. It may, for example, be used to localize faults in large areas during the processing of engineered materials for failure analysis and yield improvement purposes. Photoluminescence imaging is also difficult to combine with other imaging modalities because it provides much lower light emission characteristics than most.

Embodiments may combine the above, or other imaging modalities at the microscopic or macroscopic scale. This is useful wherever disparities occur between light intensity (energy flux) levels of the resultant light spectra of the imaging modes, e.g. conventional photographic imaging and phosphorescence or photoluminescence. In another alternative embodiment, the multimodal imaging system comprises Raman imaging as one of the imaging modes.

In an additional embodiment suitable for combining with any of the previous embodiments, the multimodal imaging system is a lens-free multimodal imaging system. This is useful for microscopic applications. Conventional microscopes are bulky, expensive and difficult to scale. Lens-free microscopy offers a solution to these limitations because it is a simple and cost-effective alternative which can be implemented in a small form factor.

The multimodal imaging system according to example embodiments of the present disclosure may be used in a method which is useful. For example, an example method attenuates at least one light source impinging on the image sensor thereby providing that the energy flux of light impinging on the image sensor from each source, or any filter element of the optical filter, is within the dynamic range of the image sensor. This can allow for multiple high quality images from different imaging modalities to be captured simultaneously when multiple light sources impinge on different regions of an image sensor. It is also useful to be able to adjust or limit the range of energy flux in some embodiments to enable lower performance and lower cost imaging sensors to be used for advanced multimodal imaging application.

The signal intensity levels may differ significantly between different imaging modes. This difference is often found to be at least an order of magnitude, with some modality mixes resulting in much greater disparity between the light intensities of different modes. In one example embodiment, the device may be applied to a method of multimodal imaging involving holography and fluorescent imaging in which case signal intensity levels may vary by five to seven orders of magnitude.

Image sensors commonly available on the market do not have sufficient dynamic range to be able to cater for such a large variation in intensity of impinging light sources. They can work effectively only with a limited dynamic range of received energy flux, generally measured in decibels (dB). Standard CMOS image sensors only have a dynamic range of approximately 60 dB, higher end image sensors may have 70 dB or more, some high end image sensors have a dynamic range of over 80 dB, but very few image sensors have a dynamic range much above 93 dB. Consequently, it is an objective of the disclosure to maintain the energy flux of light impinging on the image sensor from all imaging modes to be within the dynamic range of the image sensor. Hence, the maximum disparity between energy flux of the simultaneous imaging modes of any embodiments should meet this criteria, and be less than 65 dB, or less than 75 dB, or less than 85 dB, or less than 95 dB or less than 105 dB. For some applications it may be useful to maintain this energy flux between any of these values, e.g. at least 10 dB, or 20 dB and less that 65 dB, or any other combination of the above noted values.

An example multimodal imaging method comprises the steps of: a) illuminating a sample with a partially coherent polarized light comprising a first light spectrum and generating a second light spectrum, b) transmitting the first light spectrum and the second light spectrum through an optical filter comprising a first filter element and a second filter element arranged as an array parallel to an image sensor comprising a plurality of pixels, wherein the first light spectrum in transmitted and attenuated by the first filter element and the second light spectrum is transmitted by the second filter element, c) simultaneously capturing light transmitted by the first filter element with a first subset of imager pixels, and light transmitted by the second filter element with a second subset of imager pixels, wherein each pixel receives light via a single filter element.

In some example embodiments, the sample may be a biological sample, such as but not limited to cells, tissue, blood, or microorganisms. In another example embodiment, the sample may be a particle of biological, organic, or inorganic nature. In some example embodiments, the sample may be transparent or partially transparent which is useful for in-line holography. In an example embodiments, the sample when excited by a first light spectrum, emits a second light spectrum.

The second light spectrum can be generated by the process of fluorescence, but may also be provided by other processes known in the art such as luminescence, phosphorescence, photoluminescence, or Raman scattering, hence the second light spectrum can comprise light resulting from these processes.

These processes are useful for the identification of features associated with a sample, and different processes provide for different imaging modalities. Example embodiments may use one or a plurality of modalities supported by one or a plurality of these processes, e.g. an example embodiment uses two different fluorescent markers for identifying different features in a sample, another example embodiment uses Raman scattering and fluorescence. Any practical combination of these processes may be used by the method.

In some example embodiments, the frequency components of the first light spectrum differ from the frequency components of the second light spectrum. This can allow for filtering and separation of the light spectra based on techniques known in the art, e.g. high pass, low pass, band pass filtering, etc.

In some example embodiments, the multimodal imaging method may additionally comprise the steps of, reading data from the first subset of imager pixels of the image sensor where light transmitted by the first filter element is captured to create a first image, and reading data from the second subset of imager pixels of the image sensor where light transmitted by the second filter element is captured to create a second image. This can be useful for capturing multiple imaging modalities simultaneously which also allows for multiple modalities to be compared for the same image scene. Hence, information presented about the sample is greatly improved over separate consideration of the modalities where the scene may change. Additionally, the images may be combined into a single image with little additional processing, thereby offering a true multimodal image of the same scene which offers further information about the sample.

BRIEF DESCRIPTION OF THE FIGURES

The above, as well as additional objects, features and advantages of the disclosure, will be better understood through the following illustrative and non-limiting detailed description, with reference to the appended drawings. In the drawings like reference numerals will be used for like elements unless stated otherwise.

FIG. 1b illustrates an alternate arrangement of the multimodal imaging system, in accordance with an embodiment.

All the figures are schematic, not necessarily to scale, and generally only show parts which are necessary to elucidate example embodiments, wherein other parts may be omitted or merely suggested.

DETAILED DESCRIPTION

Example embodiments will now be described more fully hereinafter with reference to the accompanying drawings. That which is encompassed by the claims may, however, be embodied in many different forms and should not be construed as limited to the embodiments set forth herein; rather, these embodiments are provided by way of example. Furthermore, like numbers refer to the same or similar elements or components throughout.

Figure 1A:
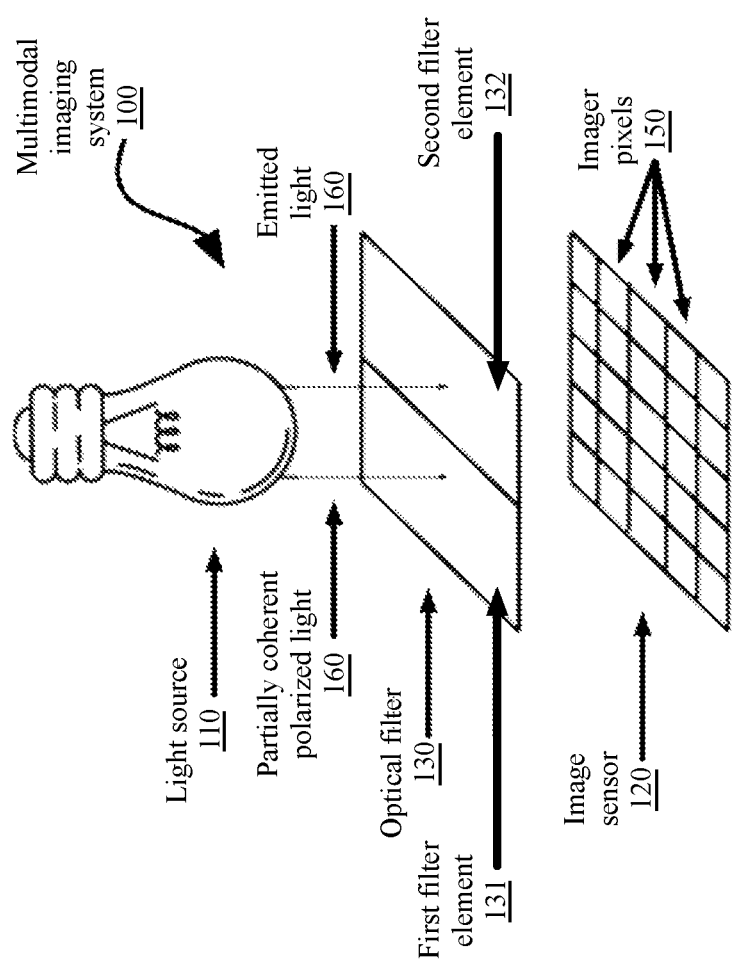
FIG. 1a illustrates a basic arrangement of the multimodal imaging system, in accordance with an embodiment.

Referring now to FIG. 1a, which illustrates the basic arrangement of the multimodal imaging system 100. The light source 110 provides illumination for a scene to be imaged and emits partially coherent polarized light 160. The light may travel directly and/or indirectly (e.g. via reflection off a sample) to the optical filter 130. The optical filter 130 comprises a first filter element 131 and a second filter element 132 which are arranged as an array parallel to the image sensor 120. The first filter element 131 is configured to attenuate the transmission of a first light spectrum which comprises polarized light emitted by the light source 110. The second filter element 132 is configured for transmission of a second light spectrum. The image sensor 120 is configured to simultaneously capture light impinging on it from both the first filter element 131 and the second filter element 132. Each filter element of the optical filter 130 is configured for transmission of light to a subset of the imager pixels 150, and each pixel 150 receives light via a single filter element. Hence, the image sensor 120 captures the image for each mode on a different subset of the imager pixels 150.

Figure 5:
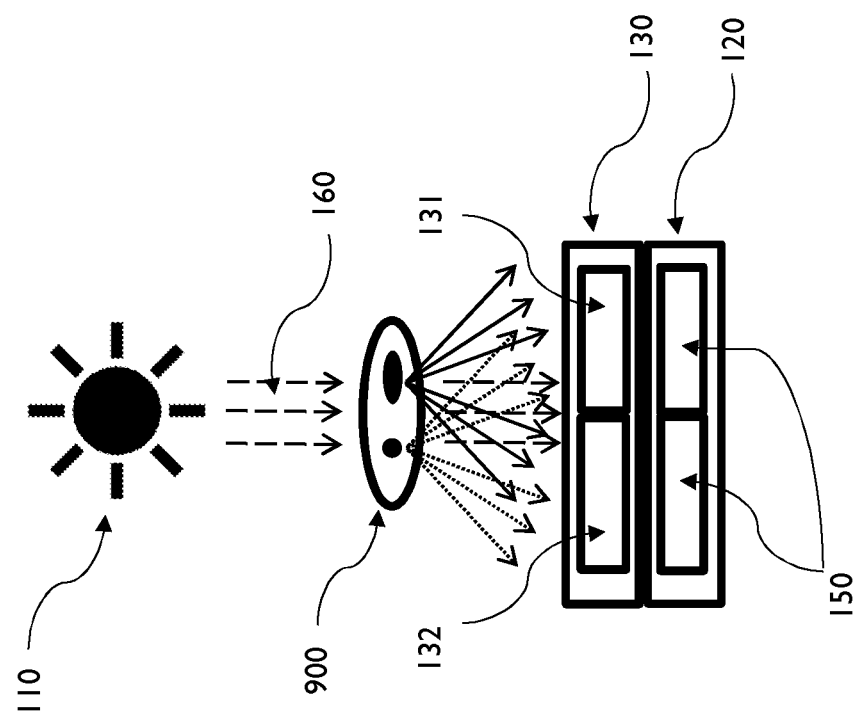
FIG. 5 illustration of a multimodal imaging system using in-line holography and fluorescence, in accordance with an embodiment.
Figure 6:
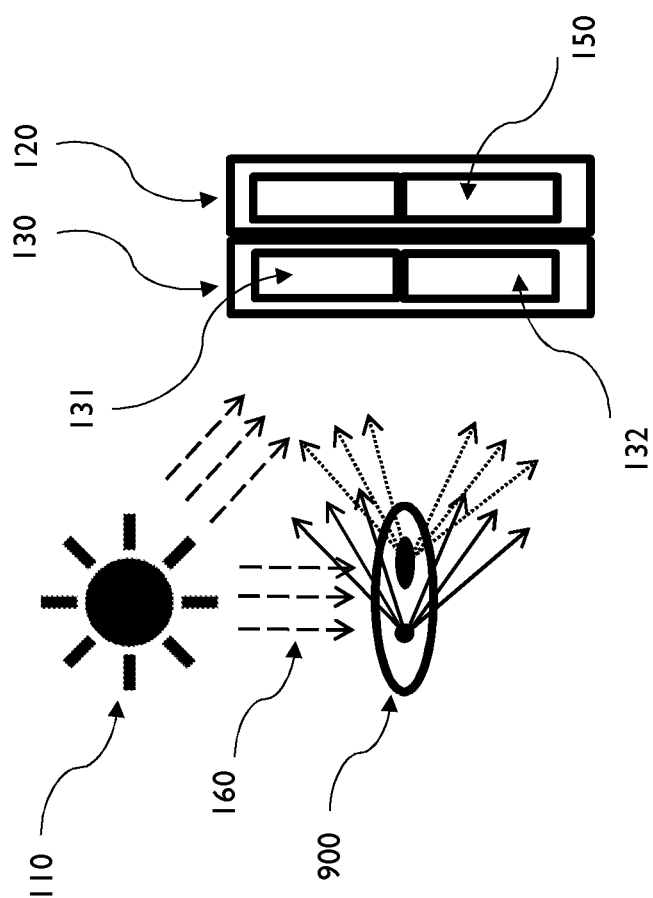
FIG. 6 illustration of a multimodal imaging system using off-axis holography and fluorescence, in accordance with an embodiment.
Figure 7:
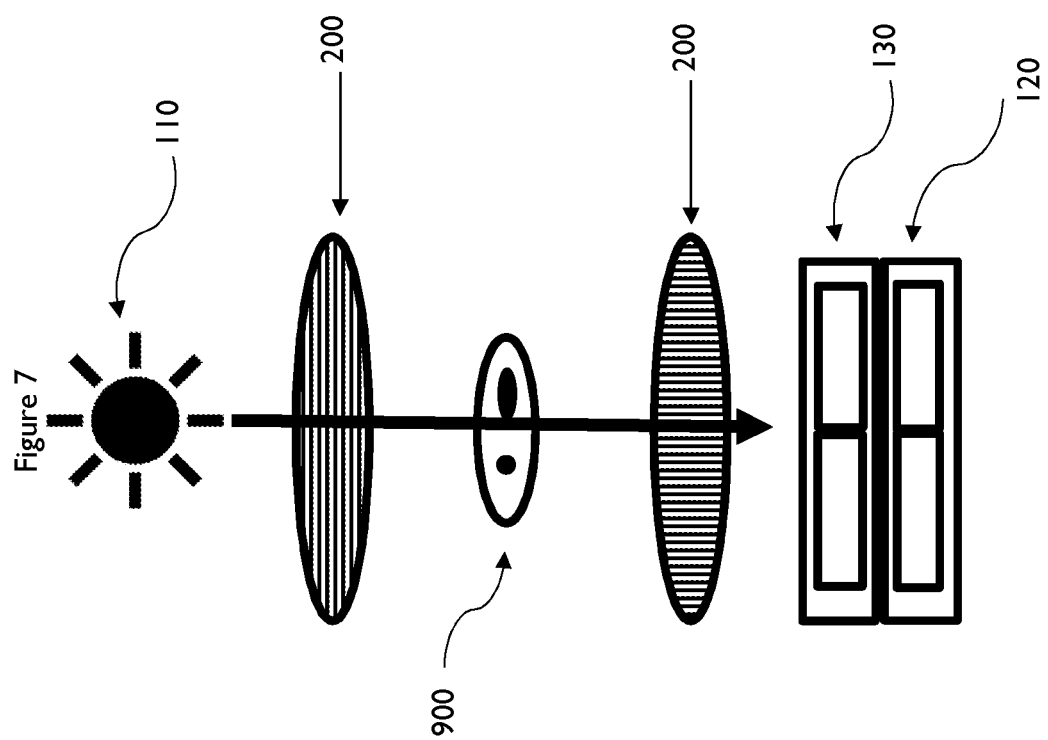
FIG. 7 illustration of a multimodal lens based imaging system in transmission mode, in accordance with an embodiment.
Figure 8:
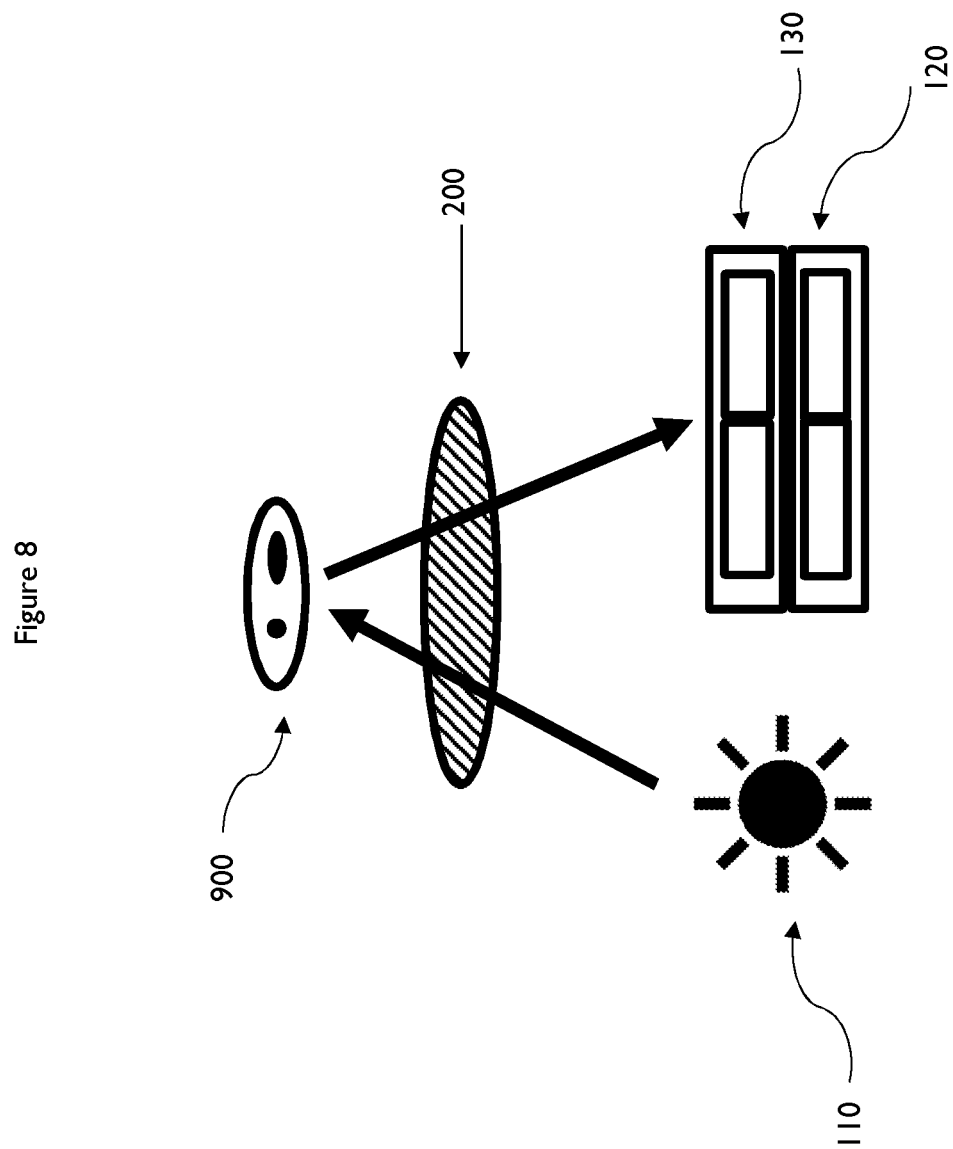
FIG. 8 illustration of a multimodal lens based imaging system in reflection (epi) mode, in accordance with an embodiment.

An example embodiment based on multimodal imaging using holography and fluorescence as the imaging modalities is illustrated in FIG. 5. In this embodiment the light source 110 emits a coherent or partially coherent polarized light 160. The emitted light 160 illuminates a sample 900 positioned between the light source 110 and the optical filter 130. A transparent or partially transparent sample 900, e.g. a biological cell, provides a suitable object for digital in-line holography, but the same basic system may be used with off-axis holography or other sample/object types, e.g. large molecules, biological tissues etc. The multimodal imaging system 100 is suitable for implementation as a lens-free solution as illustrated in FIG. 5, but standard optical components 200 (such as lenses, prisms, mirrors, apertures etc.)

may also be incorporated between the light source, object and the image sensor 120 as illustrated in FIG. 7 and FIG. 8.

Some of the emitted light 160 travels direct to the optical filter 130, while emitted light 160 impinging on the transparent sample 900 is diffracted as it passes through the sample 900. Although diffraction clearly has a significant effect on the passage of light, for samples known in the art to be suitable for in-line holographic imaging the spectrum remains substantially unchanged without any significant changes to frequency content or polarity. Hence, the first light spectrum comprises the emitted light 160, even when it only contains light which has been diffracted by the sample 900. The first filter element 131 receives the first light spectrum comprising the emitted light 160 and forming the diffraction pattern. The first filter element 131 allows transmission of the first light spectrum, but in so doing, attenuates the light thereby reducing its intensity. In an embodiment, the primary mechanism employed for this attenuation is based on polarization selectivity of the first filter element 131. The light forming the diffraction pattern then impinges on the image sensor 120, arriving only at the pixels 150 served by the first filter element 131. The second filter element 132 also receives the first light spectrum, but blocks its transmission based on spectral selectivity, high polarization selectivity, or both. Consequently, pixel elements served by the second filter element 132 do not receive the first light spectrum.

In the example embodiment of FIG. 5, the sample 900 also comprises a fluorescent marker. Multiple fluorescent markers may also be used, but in this example only one will be used for simplicity of explanation. When the light 160 impinges on the sample 900 it excites the fluorescent marker to emit light which comprises the second light spectrum. The second light spectrum differs from the first light spectrum. In this example embodiment the first light spectrum and the second light spectrum have no common frequency components due to the wavelength shift between the excitation light (first light spectrum) and the resultant fluorescent light (second light spectrum). This is not a necessary requirement, but is helpful for explanation of this simple embodiment. In this embodiment, the wavelength of the first light spectrum is shorter than the wavelength of the second light spectrum as is most often the case with fluorescence. In this example embodiment, the second light spectrum also has a different degree of polarization (DOP) than the first light spectrum as is usually the case with fluorescence because it is normally unpolarized. Here the first light spectrum has a high DOP as it is polarized or at least partially polarized light, there is not a fixed range applicable, but the higher the DOP of the first light spectrum, the more controllable the light attenuation will be. The second light spectrum comprises fluorescent light in this example which is unpolarized light and has a DOP of 0% or thereabouts.

Both the first light spectrum and the second light spectrum would then travel to the optical filter 130. When the first light spectrum comprising the emitted light 160 and the diffracted light reaches the second filter element 132 it would be blocked by a spectral filter component because the spectrum of the emitted light 160 does not fall within its pass-band. However, the second filter element 132 is configured for transmission of the second light spectrum and would allow it to pass because it does fall within the pass-band of the spectral filter component. Consequently, the imager pixels 150 served by the second filter element 132 would receive the second light spectrum.

In practice, there is a significant disparity between light intensities of the emitted light 160 which excites the fluorescent markers, and the resultant fluorescent light. This disparity can be several orders of magnitude and applies not only to the emitted light 160 but also to the diffraction pattern associated with in-line or off-axis holography. Consequently, in this example the first light spectrum has much greater light intensity than the second light spectrum.

Simply separating the light spectra of the imaging modes according to frequency, or some other basic criteria, does not necessarily result in a working system when attempting to use a single image sensor 120. Separation of light spectra is well known in the art and can be addressed in multiple ways which can be applied to this example embodiment in order to achieve clear separation of the first light spectrum and the second light spectrum so as to ensure they reach different pixels 150, or pixel groups. However, the dynamic range of image sensors 120 do not allow such a significant disparity of light intensity (also known as energy flux) as is found in this example between the first light spectrum and the second light spectrum. Even for imaging modes with less significant disparities between them, it can be useful to have closely matched energy flux levels for the first light spectrum and the second light spectrum when using the same image sensor 120 to capture their resultant images. In this way, optimal performance of the imager may be achieved. Similarly, when the imaging modes result in significantly different spectral content for the first light spectrum and the second light spectrum, controlling light intensity to match imager performance for different wavelengths can be useful.

This disparity between light intensities of the different imaging modes is particularly problematic when trying to capture the images simultaneously on different pixels 150 of the same image sensor 120. When capturing images sequentially it is possible to use alternative techniques to address the problem in part, e.g. by varying exposure time between imaging modes. However, these approaches are not suitable for simultaneous multimodal imaging when using a single image sensor 120. Instead, the approach being adopted in this embodiment is to attenuate the passage of light associated with the higher intensity imaging mode so as to arrive at comparable light intensities for each of the imaging modes arriving at the imaging sensor 120.

Clearly, the same technique of attenuating the passage of light can be applied to both the first light spectrum and the second light spectrum if desired to further facilitate balancing their respective light intensities as may be required.

The primary mechanism employed in this embodiment to attenuate the first light spectrum is based on the use of polarizing filters. In this embodiment it will be assumed that the emitted light 160, and hence the first light spectrum is linearly polarized, but other polarization geometries may also be used. When the first filter element 131 comprises a polarizing filter component it can discriminate light based on polarity, and can also attenuate the passage of polarized light. The attenuation of light can be controlled by designing the Polarization Extinction Ratio (PER) of the filter to match the desired attenuation and polarity of the first light spectrum.

Figure 4:
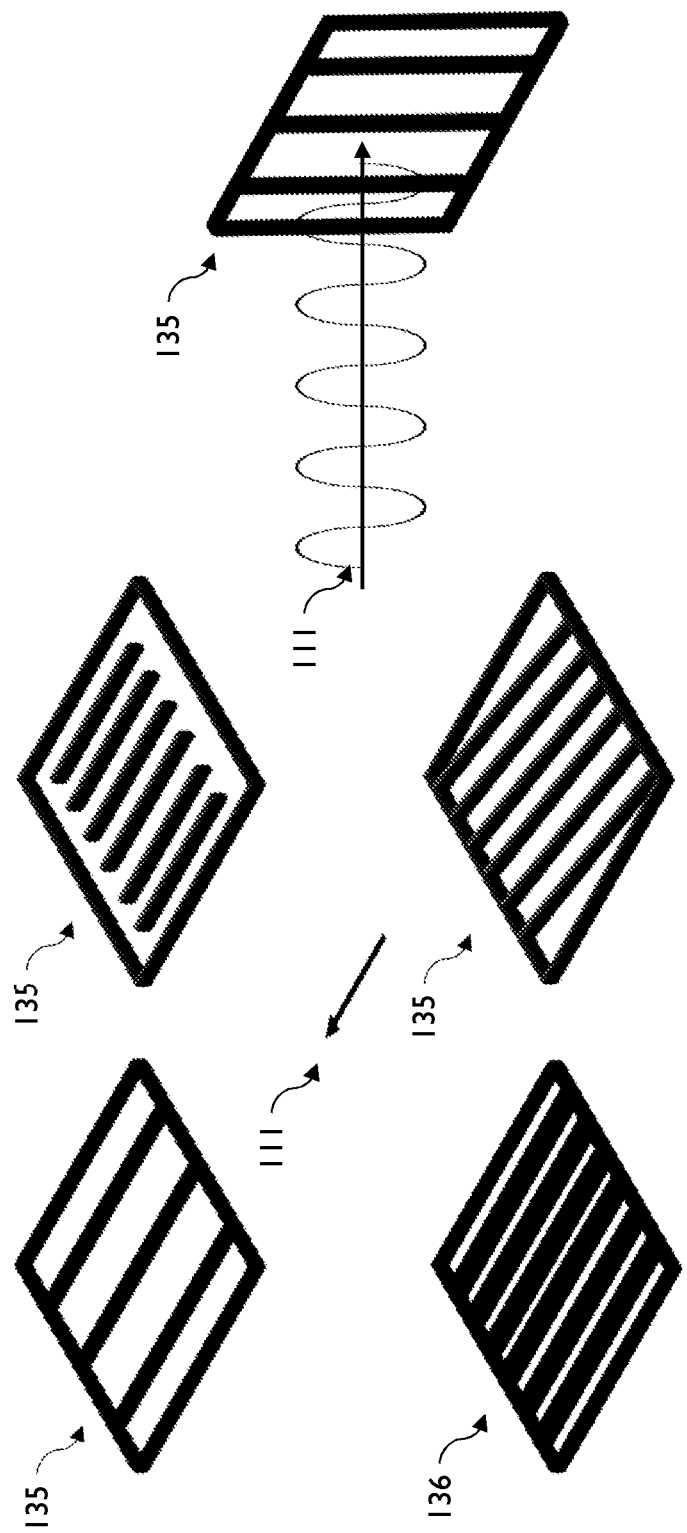
FIG. 4 illustration of the polarizing filter component features, in accordance with an embodiment.

In this embodiment, a wire grid polarization filter is employed, but other polarization filter techniques known in the art may also be used. FIG. 4 illustrates a subset of suitable wire grid polarizing filter implementations. The polarizing filter may be designed with a wire grid orientation matching the polarity (polarization angle) of the first light spectrum. By increasing the number or thickness, or both, of the wires, the PER of the filter is increased, i.e. attenuation of the polarized light is increased. Additionally, or alternatively, the geometric orientation of the wire grid with respect to the polarity of the polarized light may be misaligned to alter attenuation. When the polarity of linearly polarized light is orthogonal to the wire grid, attenuation is at its minimum, and when aligned with the wire grid, then attenuation is at its maximum.

The second filter element 132 may also comprise a polarizing filter component. In the current embodiment this could be used in addition to the spectral filter component to block the second light spectrum.

The light source 110 may comprise a laser based light source, Light Emitting Diode (LED), incandescent bulb, natural light source, or other means for emitting electromagnetic radiation as known in the art. The light source 110 may optionally comprise planar light circuits and/or photonic integrated circuits based on waveguide components to guide and manipulate light on an optical substrate. These photonic components may contain input-coupling and output-coupling structures to interface an external light source of arbitrary nature, and emit light towards an object or scene. The emitted light may be within the visible spectrum, but is equally applicable to non-visible spectra which imaging sensors may capture.

The light source 110 may optionally comprise fiber components such as single-mode-fiber or multi-mode-fiber or light guides. Such fiber components may contain additional fiber components to control the degree of polarization, spectrum and coherence of the light.

When an incandescent bulb, or other incoherent light source 110 is used, spatial filters such as a pinhole provide a partially coherent light source 110. Optionally, optical filters can be used to control the spectral content of the first light spectrum. The light source 110 may optionally comprise optical elements such as lenses, mirrors, beam splitters, prisms etc. to achieve illumination specifications such as beam shape, ray angularity and uniformity etc.

The light source 110 may emit light continuously during imaging operations, i.e. the emitted light intensity remains constant or substantially constant over time. In an alternative embodiment, the light source 110 emits a pulsed light such that light is emitted for limited periods during imaging operations, each emission period being followed by a dormant period during which no light, or a significantly reduced light intensity is emitted. The pulsed operation can repeat more than once during the imaging process. The light source 110 is driven by an electronic circuit which is optionally in communication with the image sensor 120 for synchronization purposes.

Filter elements 130 may be sensitive to the degree of polarization and the spectrum of the light. At least one of the filter elements can reflect, absorb and transmit the light according to the polarization property of the light impinging upon. Polarization filters have a property known as Polarization Extinction Ratio (PER) defined as the ratio of optical powers transmitted in the two orthogonal polarization directions. The PER value of a filter is intrinsic to the design of the filter. In an example of a wire-grid based polarization selective filter, the wire-grid material and geometry determines the PER value. Higher PER values of a filter indicates the filter has transmittance properties highly selective to the polarization state of the light, and vice versa. Filters with higher PER can block the polarized light from being transmitted through it to a greater extent than filters with lower PER.

At least one of the filter elements 130 can reflect, absorb and transmit the light according to the spectral property of the light impinging upon. The spectral filters have the property of transmitting light with wavelength within its "pass-band" while blocking light with wavelength outside of its pass-band via absorbing or reflecting it. The pass-band is defined as a spectral band in which the light can be transmitted with higher efficiency than the light outside of this spectral band.

The pass-band can be defined using parameters such as central wavelength, bandwidth, peak transmission, blocking ratio etc. Such wavelength selective filters can be designed as thin films of materials with different refractive indices, thin films of materials with birefringent properties, thin films of materials with absorbance. The relative thickness and combination of materials determine the pass-band parameters of such filters. Filter elements 130 can be manufactured in different size ranging from nanometer to meter scale.

Patterning of the filters can be done with top-down conventional semiconductor processes or bottom-up self-assembly methods. The patterning allows to multiplex filters with different spectral and polarization properties. Such filters can be positioned next to each other in the same plane orthogonal to light propagation direction and also in the plane along the light propagation direction.

Image sensors 120 are composed of a plurality of light sensitive elements, usually referred to as pixels 150. Each pixel detects photons and converts them into electrons for digital processing of the optical signal. The operating parameters of image sensors vary significantly depending on the materials of their construction and manufacturing technology employed. They can be sensitive to a wide range of spectra, e.g. wavelength ranges of 200 nm to 15 µm, and are able to operate with polarized light over the whole range of Degrees of Polarization (DOP) from 0% to 100%.

According to an embodiment compatible with all previously disclosed embodiments, the optical filter elements 131 & 132 can be patterned according to pixel 150 geometry of the image sensor 120. Pixels 150 and filter elements 131 & 132 can be geometrically aligned to each other such that each pixel 150 accepts light from a single filter element 131 or 132.

Alternatively, pixels 150 comprising the image sensor 120 can be grouped according to the filter elements such that a subgroup of pixels 150 can collect light transmitted by a specific filter element. In the simplest case half the pixels 150 comprising the image sensor 120 receive light transmitted by the first filter element 131 and half the pixel elements receive light transmitted by the second filter element 132. However, any proportions of pixels 150 to filter element 131 or 132 may be employed and any size of image sensor 120. It can also be can useful in some circumstances to use only a subset of the pixels 150 available on image sensor 120, e.g. so that some may be used for other purposes such as monitoring ambient light levels.

Figure 2:
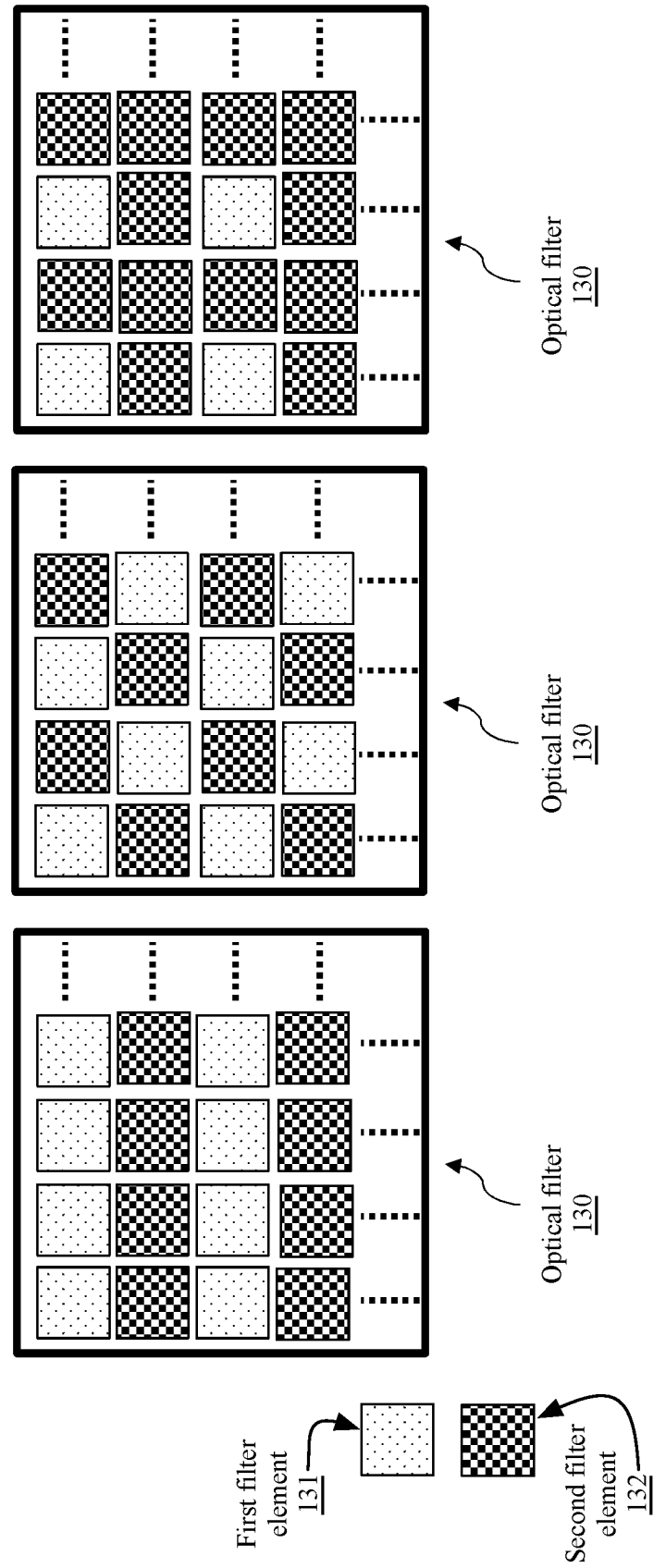
FIG. 2 illustration of various filter element arrangements, in accordance with an embodiment.

Similarly, the pixel 150 groupings may be contiguous or non-contiguous and multiple optical filter elements 131 & 132 can be arranged in arbitrary patterns, or repetitive patterns as may be appropriate for the application. A limited number of example filter arrangements are shown in FIG. 2. Clearly, additional optical filter elements may be employed for additional imaging modalities using the same image sensor 120.

After electronic read-out of the image sensor 120, data retrieved from image pixels 150 can be used to generate multiple images of a scene or a composite image of a scene, or to extract information about the scene, e.g. functional and morphological information. This information may be extracted by a computer, wherein it may be used to determine characteristics of the scene being imaged to effect a decision and/or process.

Pixels 150 in the image sensor 120 must receive light intensity (energy flux) levels of light being transmitted by the filter elements 131 & 132 which is within the dynamic range of the pixels 150 in order to perform simultaneous read-out. The dynamic range of available image sensors varies, but is limited to a range (usually expressed in dB) depending on the image sensor technology. Therefore, for image sensors to be useful in multi-modal imaging the different modalities are required to output light intensity levels within the dynamic range of the image sensor 120. In practice, the requirement is much more stringent because most imaging modalities require at least an order of magnitude larger signal to noise ratio than 1.0. Hence, it is important to equalize light intensity levels (energy flux) impinging on the imager for different modalities to facilitate effective image capture in most circumstances.

According to one aspect, the intensity of light (energy flux) impinging on the image sensor 120 for the first light spectrum and the second light spectrum can be equalized through attenuation of the light resulting from at least one of the imaging modalities. The filter elements 131 & 132 establish this optical power balance between different imaging modalities on an image sensor 120 by using the polarization and spectral attributes of the light output from different modalities.

Figure 3:
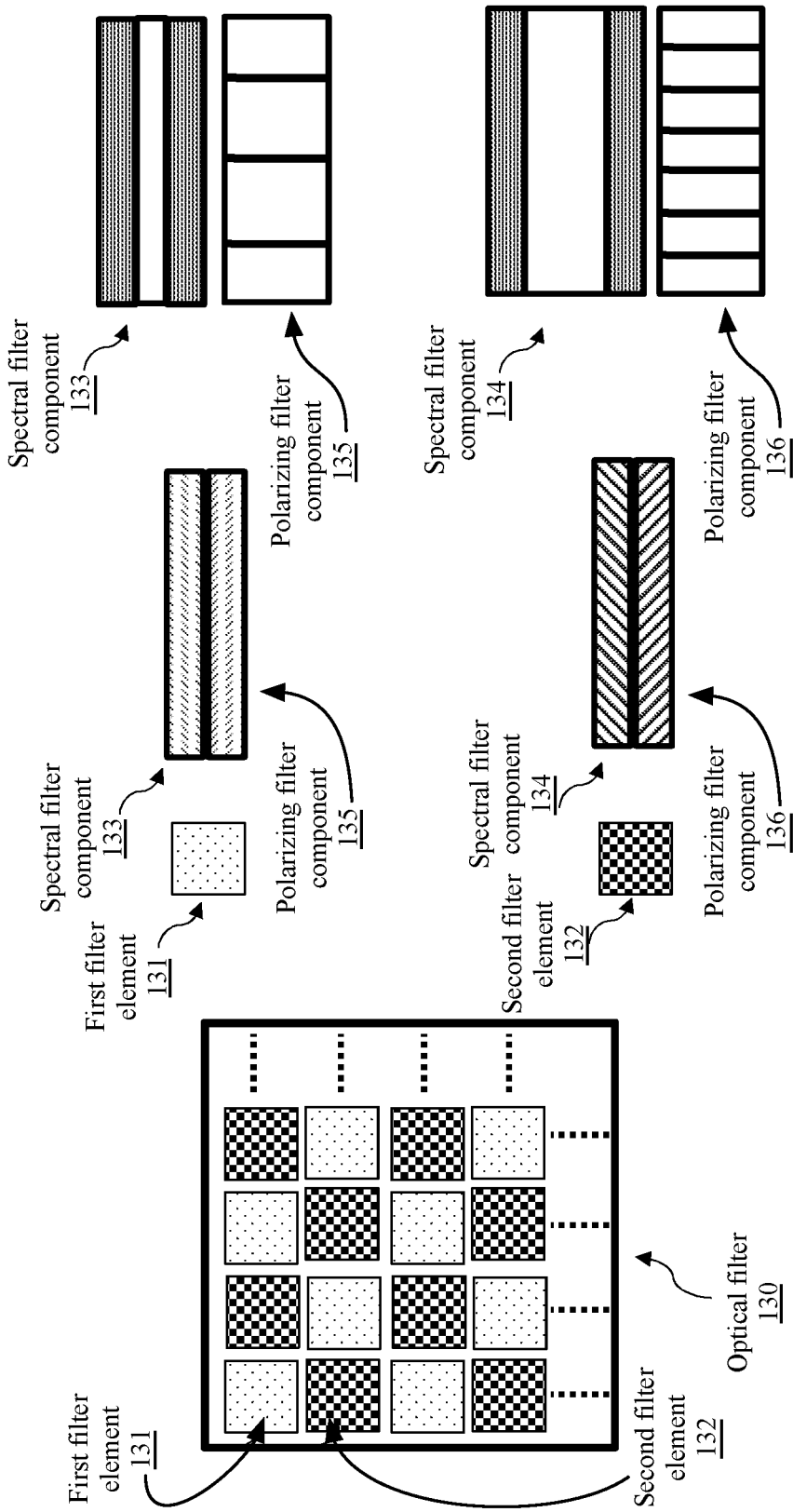
FIG. 3 illustration of filter element component arrangements, in accordance with an embodiment.

FIG. 3 illustrates an example breakdown and schematic cross-sections of the filter elements 131 & 132 in terms of their stacked structure. The first element 131 consists of two filter components (stacked structures). The first filter component (top stack) (133) is a spectral filter component designed to transmit the pass-band corresponding to the first light spectrum and reflect the second light spectrum. In various embodiments the second light spectrum may correspond to the Stokes or Anti-stokes shifted light originated from an object in response to absorption of the light emitted from a light source 110. In alternative embodiments it may relate to non-resonant scattering of light emitted from a light source 110 or spontaneously emitted (blackbody) radiation. Any combination of these embodiment may be adopted to address application needs.

The second filter component (bottom stack) 135 is a polarizing filter component designed to attenuate polarized light of the first light spectrum which has been transmitted by the first filter component (top stack) 133. The attenuation of polarized light is an important feature of this second filter component (bottom stack) 135. It is required that the light intensity of the first light spectrum after transmission through the first filter element 131 is reduced to a level comparable with the second light spectrum after transmission through the second filter element 132 so that light impinging on the image sensor 120 falls within the dynamic range of the image sensor 120. Thus, the first filter element 131 attenuates the transmission of the first light spectrum while blocking transmission of the second light spectrum.

The second filter element 132 comprises at least one filter component, in which case the filter component may be a spectral filter component or a polarizing filter component. In embodiments where the second filter element 132 comprises two filter components arranged in the same light path (e.g. two stacked structures). The first filter component (top stack) 134 is a spectral filter component designed to transmit the pass-band corresponding to the second light spectrum.

The first filter component also blocks transmission of the first light spectrum, but may partially transmit it, e.g. significantly attenuate it. This may, for example, be due to filter design, filter methodology, or circumstances where the first light spectrum and the second light spectrum have some immediately adjacent or common frequency components, e.g. some overlap in the frequency domain.

The second filter component (bottom stack) 136 is a polarization filter component differently designed from the polarizing filter component 135 of the first filter element 131. It is designed to completely extinguish the linearly polarized first light spectrum but will also cause partial attenuation of the second light spectrum. In some application, e.g. fluorescence imaging, this is seen in the art as undesirable because of the low light intensity levels involved. However, it has been found that balancing light levels impinging on the image sensor 120 for the different imaging modes can outweigh this minor disadvantage. The second light spectrum may comprise partially polarized light originating from the scene being imaged. The extent of attenuation of the second light spectrum depends on its degree of polarization. For example, unpolarized light will be reduced by a factor of 50%, while polarized light will be reduced by a factor of 100%. Hence, in embodiments where the second filter element 132 comprises a spectral filter component and polarizing filter component, the second filter element 132 also attenuates the second light spectrum while blocking the first light spectrum.

In an example embodiment, Fabry-Perot filters are used to realize the spectral filter components of the two filter elements 133 and 134, but other interference filters, or other filter types (e.g. dichroic filters) may be used. In an example embodiment, design of Fabry-Perot filters comprises, an optically transparent cavity layer embedded between two partially reflective layers. The pass-band attributes of the spectral filter components of the first filter element 131 and the second filter element 132 can be tailored for the spectrally different light of the first light spectrum and the second light spectrum to separate the two light spectra as indicated above.

In an example embodiment which may be combined with any of the above embodiments, wire-grid polarizing filters are used to realize the polarizing filter component of the filter elements 135 and 136. The wire-grid filters may comprise many parallel metallic wires that are placed in an optically transparent medium with a defined orientation, periodicity and thickness. A difference between the polarizing filter components 135 & 136 of the first filter element 131 and the second filter element 132 is that the second polarizing filter component 136 provides a higher polarized light extinction than the first polarizing filter component 135. In this way only the second light spectrum may impinge on pixels 150 associated with the second filter element 132

In an example embodiment, different levels of polarized light extinction can be achieved by using polarizing filter components 135 & 136 with different Polarization Extinction Ratios (PER). This can be achieved by using different materials for wires and surrounding medium of the wires, different geometry of the wires or wire repetition period as illustrated in FIG. 4.

In another example embodiment which may also be combined with the previous embodiment, different levels of polarized light extinction can be achieved through changing the wire orientation with respect to polarization angle of the polarized light 111 on the plane perpendicular to the light propagation as illustrated in FIG. 4.

Larger angular mismatch between the wire orientation and light polarization angles reduces the polarized light extinction. Such mechanisms can be used to achieve varying attenuation levels by the polarizing filter component 135 of the first filter element 131. On the other hand, it is desired to have maximum polarized light attenuation by the polarizing filter component 136 of the second filter element 132. This condition can be realized through using a high PER filter of which the orientation of the wire-grids are aligned with the polarization angle of the light 111 as shown in FIG. 4.

While some embodiments have been illustrated and described in detail in the appended drawings and the foregoing description, such illustration and description are to be considered illustrative and not restrictive. Other variations to the disclosed embodiments can be understood and effected in practicing the claims, from a study of the drawings, the disclosure, and the appended claims. The mere fact that certain measures or features are recited in mutually different dependent claims does not indicate that a combination of these measures or features cannot be used. Any reference signs in the claims should not be construed as limiting the scope.

What is claimed is:

1. A multimodal imaging system comprising:
   a light source configured to emit partially coherent polarized light, wherein an intensity of the partially coherent polarized light within a first light spectrum is different from an intensity of the partially coherent polarized light within a second light spectrum;
   an optical filter configured to equalize the intensity of the partially coherent polarized light within the first light spectrum and the intensity of the partially coherent polarized light within the second light spectrum, wherein the optical filter comprises a first filter element configured to attenuate and transmit light within the first light spectrum via polarization selectivity and a second filter element configured to transmit light within the second light spectrum; and
   an image sensor configured to receive equalized partially coherent polarized light transmitted through the optical filter, wherein the first filter element and the second filter element are arranged as an array parallel to the image sensor and each filter element is configured to transmit light to a subset of the plurality of pixels, and each pixel receives light via a single filter element.

2. The multimodal imaging system according to claim 1, wherein a frequency components of the first light spectrum differ from the frequency components of the second light spectrum.

3. The multimodal imaging system according to claim 2, wherein a degree of polarisation of the first light spectrum is not equal to a degree of polarisation of the second light spectrum.

4. The multimodal imaging system according to claim 1, wherein a degree of polarisation of the first light spectrum is not equal to a degree of polarisation of the second light spectrum.

5. The multimodal imaging system according to claim 4, wherein the light source emits light pulses and the first light spectrum comprises a first pulse sequence.

6. The multimodal imaging system according to claim 1, wherein the light source emits light pulses and the first light spectrum comprises a first pulse sequence.

7. The multimodal imaging system according to claim 6, wherein an energy flux of light impinging on the image sensor from any filter element of the optical filter is within a dynamic range of the image sensor.

8. The multimodal imaging system according to claim 1, wherein an energy flux of light impinging on the image sensor from any filter element of the optical filter is within a dynamic range of the image sensor.

9. The multimodal imaging system according to claim 1, wherein at least the first filter element comprises a spectral filter component and a polarising filter component arranged in a same light path.

10. The multimodal imaging system according to claim 9, wherein
    the second filter element also comprises a polarising filter component, and
    the polarising filter component of the first filter element has a lower Polarisation Extinction Ratio (PER) than the polarising filter component of the second filter element.

11. The multimodal imaging system according to claim 1, wherein the multimodal imaging system is configured to perform holographic imaging.

12. The multimodal imaging system according to claim 1, wherein the multimodal imaging system is configured to perform fluorescence imaging.

13. The multimodal imaging system according to claim 1, wherein the multimodal imaging system is a lens-free multimodal imaging system.

14. An apparatus for characterising biological material comprising a multimodal imaging system according to claim 1.

15. A multimodal imaging method comprising:
    illuminating a sample with a partially coherent polarized light comprising a first light spectrum;
    generating a second light spectrum;
    transmitting the first light spectrum and the second light spectrum through an optical filter configured to equalize the intensity of the partially coherent polarized light within the first light spectrum and the intensity of the partially coherent polarized light within the second light spectrum, wherein the optical filter comprises a first filter element configured attenuate and transmit light within the first light spectrum via polarization selectivity and a second filter element configured to transmit light within the second light spectrum, wherein the first filter element and the second filter element are arranged as an array parallel to an image sensor, wherein the image sensor comprises a plurality of pixels, wherein the first light spectrum is transmitted and attenuated by the first filter element and the second light spectrum is transmitted by the second filter element; and
    simultaneously capturing light transmitted by the first filter element with a first subset of imager pixels, and light transmitted by the second filter element with a second subset of imager pixels, wherein each pixel receives light via a single filter element.

16. The multimodal imaging method according to claim 15 wherein frequency components of the first light spectrum differ from frequency components of the second light spectrum.

17. The multimodal imaging method according to claim 16, wherein an energy flux of light impinging on the image sensor from any filter element of the optical filter is within a dynamic range of the image sensor.

18. The multimodal imaging method according to claim 16, further comprising:
    reading data from the first subset of imager pixels of the image sensor, wherein light transmitted by the first filter element is captured to create a first image, and reading data from the second subset of imager pixels of the image sensor, wherein light transmitted by the second filter element is captured to create a second image.

19. The multimodal imaging method according to claim 15, wherein an energy flux of light impinging on the image sensor from any filter element of the optical filter is within a dynamic range of the image sensor.

20. The multimodal imaging method according to claim 15, further comprising:
reading data from the first subset of imager pixels of the image sensor, wherein light transmitted by the first filter element is captured to create a first image, and
reading data from the second subset of imager pixels of the image sensor, wherein light transmitted by the second filter element is captured to create a second image.

* * * * *